United States Patent [19]

Yoneshige et al.

[11] Patent Number: 4,944,992

[45] Date of Patent: Jul. 31, 1990

[54] CUSHION

[75] Inventors: Yasuo Yoneshige, Kawasaki; Atsushi Misumi, Yokohama; Shuji Hiromoto, Chigasaki; Toru Sakai, Tokyo, all of Japan

[73] Assignee: NHK Spring Co., Ltd., Yokohama, Japan

[21] Appl. No.: 319,749

[22] Filed: Mar. 7, 1989

[30] Foreign Application Priority Data

Apr. 14, 1988 [JP] Japan .................................. 63-92046

[51] Int. Cl.[5] .................................................. B32B 9/00

[52] U.S. Cl. .......................................... 428/198; 5/448; 297/219; 428/212; 428/213; 428/284; 428/288; 428/297; 428/298; 428/423.1; 428/360; 428/224

[58] Field of Search ............................ 5/448; 297/219; 428/212, 213, 198, 297, 298, 288, 284, 423.1, 360, 224

[56] References Cited

U.S. PATENT DOCUMENTS 4,515,854 5/1985 Kogame et al. .................... 428/288

FOREIGN PATENT DOCUMENTS 0078682 5/1983 European Pat. Off. .

2028121 3/1980 United Kingdom .

*Primary Examiner*—James J. Bell

*Attorney, Agent, or Firm*—Frishauf, Holtz, Goodman & Woodward

[57] ABSTRACT

In a cushion which uses synthetic cotton formed of curled polyester fibers, the synthetic cotton is a mixture of first and second fibers having two different thicknesses. The fibers are three-dimensionally intertwined with air-passing space. The first fibers have the denier value of 20 or more, while the second fibers have the denier value of less than 20. The first and second fibers are mixed in the ratio of 0.5 to 2:1 by weight. These fibers of the synthetic cotton are bound at their intersections by means of a polyurethane binder such that the air-passing space is maintained.

16 Claims, 3 Drawing Sheets

CUSHION

BACKGROUND OF THE INVENTION

1. Field of the Invention

The present invention relates to cushions adapted for use as pads in seats of vehicles, such as automobiles, and in furniture, e.g., couches, chairs and the like.

2. Description of the Prior Art

Conventionally, various materials are used for cushions in vehicular seats and household furniture. The cushion materials include, for example, palmrock, formed of palm fibers, and synthetic foams such as polyurethane foam. A novel cushion has recently been developed. In this cushion, curled or crimped fibers of synthetic cotton are bound together by means of a bonding agent.

In general, cushions are required to have various properties, depending on their applications. Cushions for use as pads in vehicular seats, for example, are expected to have the following characteristics.

(1) Comfortableness. To be able to absorb vibration efficiently, have their bearing surface free from deviation in pressure distribution, and be moderately flexible.

(2) High durability. To be subject to less permanent set in fatigue after repeated use.

(3) Good air-permeability. To be agreeable to the skin after prolonged sitting, without becoming stuffy or heavy with moisture and heat.

A conventional cushion formed of palmrock cannot enjoy characteristics (1) and (2). On the other hand, synthetic foam cannot fulfill requirements (2) and (3).

In order to produce cushions which fulfill all of requirements (1) to (3), the inventors hereof have been attempting to develop improved cushions in which fibers of synthetic cotton are bound together by means of a bonding agent. Since those cushions in car seats are used under severe conditions, however, they cannot easily fulfill all the aforesaid requirements. If one such cushion is formed of fibers with the denier value over 50, for example, then it has too stiff a surface to be agreeable to the touch, and is poor in durability. Also, the fibers are so rigid that the cushion cannot be easily formed into a desired shape. If the cushion is formed of relatively fine fibers with the denier value of less than 20, on the other hand, it is agreeable to the touch, enjoys high durability, and can be easily formed into a desired shape, due to the low rigidity of the fibers. In this case, however, the cushion is so poor in air-permeability that it will become stuffy or heavy with moisture and heat after prolonged sitting.

SUMMARY OF THE INVENTION

Accordingly, the object of the present invention is to provide a cushion which is comfortable to sit on and has high durability and good air-permeability. The inventors hereof thought of mixing fibers with two different thicknesses, graded with the denier value of about 20 as a boundary, in a cushion which is formed by binding curled fibers by means of a polyurethane fibers. Thus, according to the present invention, the cushion is formed of synthetic cotton which is obtained by mixing first polyester fibers with the denier value of about 20 or more and second polyester fibers with the denier value of less than 20, substantially in the ratio 0.5 to 2:1 by weight. These individual fibers are three-dimensionally intertwined. Intersections between these fibers are bound by means of a cured polyurethane binder. A seat pad may be composed of one such cushion, or a laminate structure including a plurality of such cushions of different types stacked in the direction of the thickness of the pad. The denier values of the fibers used in the cushion of the present invention need not always be identical with the values used in those examples mentioned later. It is to be understood that the thicknesses of the fibers actually used to effect the invention may be set within a practical range covering the denier values described herein.

The cushion according to the present invention can fulfill all of aforesaid requirements (1) to (3). Table 1 shows data on the tensile strength, tear strength, and air-permeability of various cushions using fibers with different denier values. In this table, 1 kg means 9.8 N (Newton). Any of the fibers constituting each cushion is a polyester fiber. Synthetic cotton formed of an aggregate of these fibers is impregnated with a trichlene solution of polyurethane prepolymer including isocyanate group, for use as a binder material, and is then centrifuged to remove any excess solution so that the binder content ranges from 25 to 35%. The binder content may be defined as a value given by W2/W1 where W1 is the gross weight of the cushion after the prepolymer is cured, and W2 is the weight of the binder in the cushion. The synthetic cotton, impregnated with the binder solution, is packed to a predetermined density into a punched metal mold. Thereafter, steam is blown into the mold to cure the polyurethane prepolymer.

TABLE 1

(Average value)

| Items | Denier value | | | | | | |
|---|---|---|---|---|---|---|---|
| | 6d | 14d | 20d | 28d | 38d | 38 + 6d | 38 + 14d |
| Density of synthetic cotton (Kg/m$^3$) | 32.8 | 32.9 | 32.7 | 36.5 | 34.4 | 32.4 | 32.8 |
| Tensile strength (kgf/cm$^2$) | 6.17 | 6.03 | 6.31 | 3.14 | 1.90 | 4.69 | 6.0 |
| Tear strength (Kgf/cm) | 4.93 | 4.85 | 4.88 | 2.77 | 1.75 | 4.06 | 4.99 |
| Air-permeability (cc/cm$^2$/sec) | 101.4 | 179.2 | 227.6 | 296.9 | 363.8 | 181.9 | 263.8 |

FIGS. 1 and 2 are graphs plotted in accordance with Table 1. The tensile and tear strengths change drastically at points corresponding to the denier value of about 20. If the 20 deniers is exceeded, the strengths of a cushion formed of fibers with a large denier value lower considerably. In the case of a cushion (e.g., 38+14*d* or 38+6*d*) formed of a mixture of fibers with the denier value of 20 or more and fibers with the denier value of less than 20, the tensile and tear strengths are as high as those of a cushion including fibers with the denier value of about 20, and the air-permeability is as good as that of a cushion including fibers with the denier value of 20 or more. Besides polyester fibers, any other synthetic fibers, such as nylon, acrylic, and polypropylene, may be available for use in the present invention.

DETAILED DESCRIPTION OF THE PREFERRED EMBODIMENTS

Example 1

First curled short polyester fibers of 38 deniers and second curled short polyester fibers of 6 deniers were mixed substantially in the ratio 1:1 by weight and three-dimensionally intertwined with air-passing space among fibers. The length of the fibers ranged from about 20 to 150 mm. Synthetic cotton formed of the resulting fiber mixture was impregnated with a 50% trichlene solution of polyurethane prepolymer including isocyanate group, and was then centrifuged to remove any excess solution so that the binder content ranged from 25 to 35%.

The synthetic cotton, impregnated with the aforesaid solution, was packed to a predetermined density into a punched metal mold. After steam was blown into the mold to cure the polyurethane prepolymer, a resulting cushion was removed from the mold.

Figure 1:
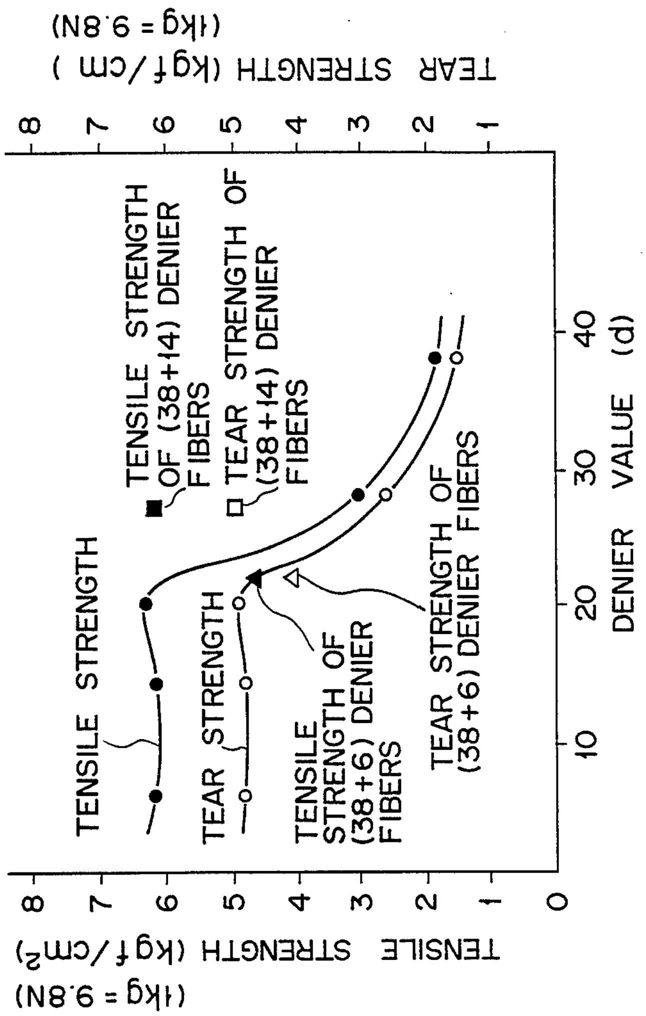
FIG. 1 is a graph showing relationships between the denier value, tensile strength, and tear strength.
Figure 2:
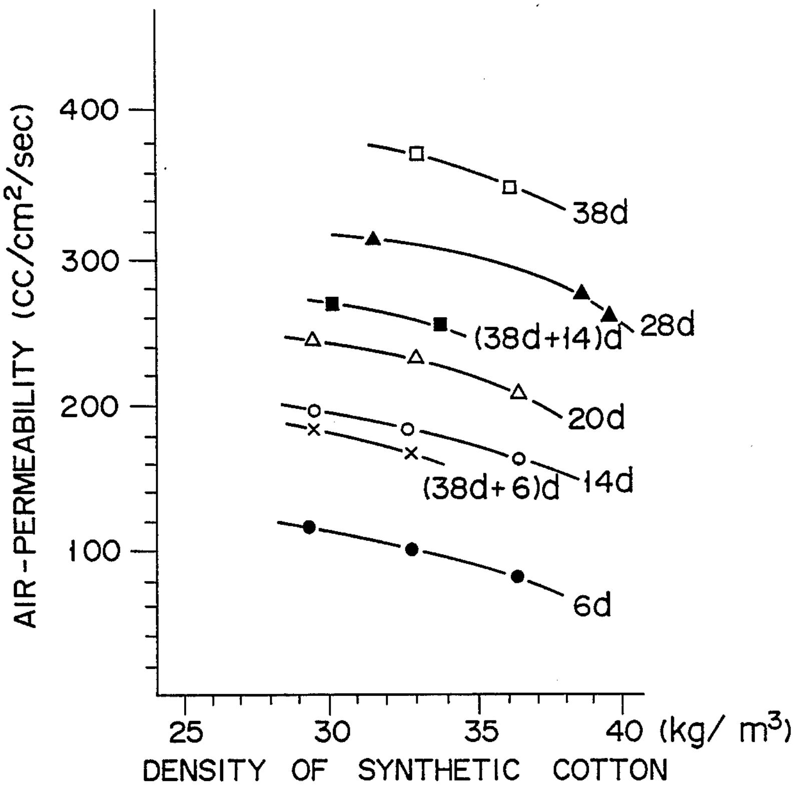
FIG. 2 is a graph showing relationships between the density of synthetic cotton, denier value, and air-permeability.
Figure 3:
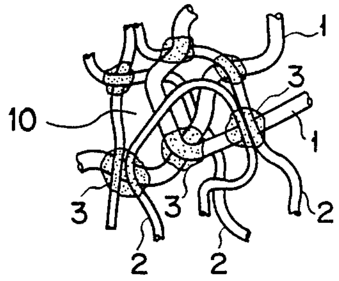
FIG. 3 is an enlarged view showing part of as cushion according to an embodiment of the present invention.

In the cushion obtained in this manner, as shown in FIG. 3, first fibers 1 with a large denier value and second fibers 2 with a small denier value were bound at their intersections by means of polyurethane binder 3. Also, the surfaces of fibers 1 and 2 were coated with binder 3. Air-passing space 10 are maintained among fibers 1 and 2. The air-permeability of the cushion ranged from 200 to 240 $cc/cm^2/sec$. This cushion was used as middle layer 6 of seat pad 4 which comprises upper, middle, and lower layers 5, 6 and 7 (see FIG. 4). Thereupon, the seat pad exhibited high durability and good air-permeability. Since the surface of pad 4 was hardly subject to any unevenness or projecting fibers, moreover, the resulting product enjoyed good appearance, and was comfortable to sit on.

Example 2

First curled polyester fibers of 38 deniers and second curled polyester fibers of 14 deniers were mixed substantially in the ratio 1:1 by weight. Resulting synthetic cotton was impregnated with a 60% trichlene solution of polyurethane prepolymer, and was then centrifuged to remove any excess solution so that the binder content ranged from 25 to 35%. This synthetic cotton was packed to a predetermined density into the same mold as was used in Example 1. After steam was blown into the mold to cure the polyurethane prepolymer, a resulting cushion was removed from the mold.

The air-permeability of this cushion ranged from 116 to 180 $cc/cm^2/sec$. The appearance and durability of this cushion were substantially as good as those of the cushion of Example 1.

Example 3

Figure 4:
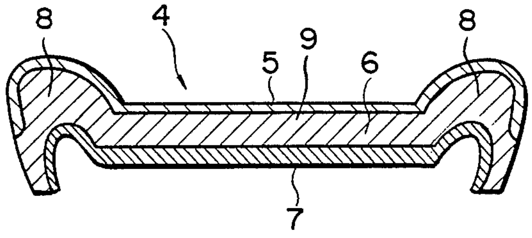
FIG. 4 is a sectional view of a seat pad using the cushion according to the embodiment of the invention.

Cushion or seat pad 4 of this example comprises upper, middle, and lower layers 5, 6 and 7, as shown in FIG. 4. A pair of bank-shaped side support portions 8 are formed on both sides of center main portion 9. Curled polyester fibers of 6 deniers were used for upper layer 5 of 5 mm thickness. Upper synthetic cotton formed of these fibers was impregnated with a 45% trichlene solution of polyurethane prepolymer, and was then centrifuged to remove any excess solution so that the binder content ranged from 25 to 35%.

Middle layer 6 of 25 mm thickness was formed from middle synthetic cotton which was obtained by mixing first curled polyester fibers of 38 deniers and second curled polyester fibers of 6 deniers substantially in the ratio 1:1 by weight. This middle synthetic cotton was impregnated with a 50% trichlene solution of polyurethane prepolymer, and was then centrifuged to remove any excess solution so that the binder content ranged from 25 to 35%.

Curled polyester fibers of 38 deniers were used for lower layer 7 of 10 mm thickness. Lower synthetic cotton formed of an aggregate of these fibers was needle-punched under conditions including the number of needles of 100 $needles/cm^2$, punching frequency of 100/min, and cotton feed speed of 1.5 m/min. In the needle-punched synthetic cotton, the fibers were intertwined more complicatedly than before the needle-punching. Thus, the cotton was in the form of a relatively thin, high-mat. This mat-shaped lower synthetic cotton was impregnated with a trichlene solution of polyurethane prepolymer, and was then centrifuged to remove any excess solution so that the binder content ranged from 25 to 35%.

The synthetic cotton, constituting each of layers 5, 6 and 7 impregnated and coated with the binder solution in the aforementioned processes, was packed to a predetermined density into the mold. After steam was blown into the mold to cure the polyurethane prepolymer, the resulting cushion was removed from the mold.

Figure 5:
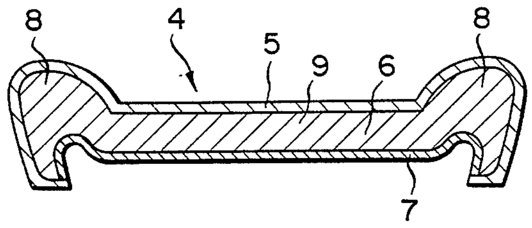
FIGS. 5 and 6 are sectional views showing different seat pads according to the present invention.
Figure 6:
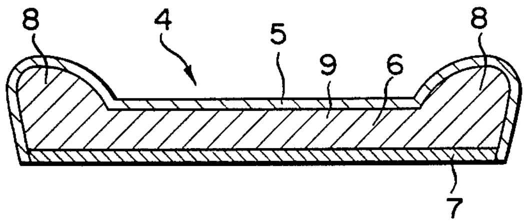

The seat pad 4 is not limited to the one shown in FIG. 4. According to the invention, layers 5, 6 and 7 shown in FIGS. 5 and 6 can be used.

Example 4

A cushion or seat pad of this example also comprises upper, middle, and lower layers 5, 6 and 7. Curled polyester fibers of 20 deniers were used for upper layer 5 of 5 mm thickness. Upper synthetic cotton formed of these fibers was impregnated with a 45% trichlene solution of polyurethane prepolymer, and was then centrifuged to remove any excess solution so that the binder content ranged from 25 to 35%.

Middle layer 6 of 25 mm thickness was formed from synthetic cotton which was obtained by mixing first curled polyester fibers of 38 deniers and second curled polyester fibers of 6 deniers substantially in the ratio 1:1 by weight. This middle synthetic cotton was impregnated with a 50% trichlene solution of polyurethane prepolymer, and was then centrifuged to remove any excess solution so that the binder content ranged from 25 to 35%.

First curled polyester fibers of 38 deniers and second curled polyester fibers of 14 deniers were used for lower layer 7 of 10 mm thickness. Lower synthetic cotton formed of this fiber mixture was needle-punched under the same conditions of Example 3. After this needle-punching, the resulting mat-shaped lower synthetic cotton was impregnated with a 60% trichlene solution of polyurethane prepolymer, and was then centrifuged to remove any excess solution so that the binder content ranged from 25 to 35%.

The synthetic cotton, constituting each of layers 5, 6 and 7 thus impregnated and coated with the binder solution, was packed to a predetermined density into the mold. After steam was blown into the mold to cure the polyurethane prepolymer, the resulting cushion was removed from the mold.

Example 5

Curled polyester fibers of 6 deniers were used for upper layer 5. Middle layer 6 was formed from synthetic cotton which was obtained by mixing first curled polyester fibers of 38 deniers and second curled polyester fibers of 14 deniers substantially in the ratio 1:1 by weight. This synthetic cotton was impregnated with a 50% trichlene solution of polyurethane prepolymer, and was then centrifuged to remove any excess solution so that the binder content ranged from 25 to 35%. Lower layer 7 was formed from mat-shaped synthetic cotton which was obtained by needle-punching synthetic cotton comprising curled polyester fibers of 38 deniers, in the same manner as in Example 3.

Example 6

Curled polyester fibers of 6 deniers were used for upper layer 5 of 5 mm thickness. Upper synthetic cotton formed of these fibers was impregnated with a 45% trichlene solution of polyurethane prepolymer, and was then centrifuged to remove any excess solution so that the binder content ranged from 25 to 35%.

Curled polyester fibers of 20 deniers were used for middle layer 6 of 25 mm thickness. This synthetic cotton was impregnated with a 45% trichlene solution of polyurethane prepolymer, and was then centrifuged to remove any excess solution so that the binder content ranged from 25 to 35%.

Lower layer 7 of 10 mm thickness was formed from synthetic cotton which was obtained by mixing first curled polyester fibers of 38 deniers and second curled polyester fibers of 14 deniers substantially in the ratio 2:1 by weight. This lower synthetic cotton was needle-punched under the same conditions of Example 3. The needle-punched lower synthetic cotton was impregnated with a 60% trichlene solution of polyurethane prepolymer, and was then centrifuged to remove any excess solution so that the binder content ranged from 25 to 35%.

Those synthetic cottons, thus impregnated and coated with the binder solution, were packed to the punched-metal mold. After steam was blown into the mold to cure the polyurethane prepolymer, the resulting cushion was removed from the mold.

Table 2 shows various properties of the cushions of Examples 3 to 6 and a cushion of a comparative example. The cushion of the comparative example is formed of upper and middle layers. In each of these layers, polyester fibers of 38 deniers are bound by means of a polyurethane binder.

TABLE 2

| | Comparative Example | Example 3 | Example 4 | Example 5 | Example 6 |
|---|---|---|---|---|---|
| Layer | | | | | |
| Upper | 38d | 6d | 20d | 6d | 6d |
| Middle | 38d | (38d + 6d) | (38d + 6d) | (38d + 14d) | 20d |
| Lower | | 38d Needling | (38d + 14d) Needling | 38d Needling | (38d + 14d) Needling |
| Thickness | | | | | |
| Upper Layer | 5 mm | 5 mm | 5 mm | 5 mm | 5 mm |
| Middle Layer | 25 mm | 25 mm | 25 mm | 25 mm | 25 mm |
| Lower Layer | | 10 mm | 10 mm | 10 mm | 10 mm |
| Air-permeability ($cc/cm^2/sec$) | | | | | |
| Upper ↓ Lower | 220 | 167～199 | 148～156 | 151～169 | 140～150 |
| Evaluation | | | | | |
| Appearance and formability | Uneven. Rugged surface with projecting fibers. Hard to form. | Good appearance No projecting fibers. Easy to form. | (same as Example 3) | (same as Example 3) | (same as Example 3) |
| Endurance test (permanent set in fatigue) | 13 mm permanent set Damaged fibers in middle layer | 3 mm permanent set | 3 mm permanent set | 3 to 4 mm permanent set | 3 mm permanent set |

*Air-permeability is based on JIS L-1096.
*Endurance test: Weight of pressure plate: 60 Kg
Acceleration: ±0.6 G
Repetition frequency: $3 \times 10^6$

What is claimed is:

1. A cushion comprising:

synthetic cotton consisting essentially of first curled synthetic fibers with a denier value of 20 or more and second curled synthetic fibers with a denier value of less than 20, said first and second synthetic fibers being mixed in the ratio of 0.5 to 2:1 by weight and three-dimensionally intertwined with air-passing space among them; and a polyurethane binder binding the intersections of the first and second synthetic fibers, such that said air-passing space is maintained.

2. The cushion according to claim 1, wherein said first and second fibers are polyester.

3. The cushion according to claim 2, wherein the binder content ranges from 25% to 35%.

4. The cushion according to claim 2, wherein said first and second fibers have a denier values of about 38 and 6, respectively.

5. The cushion according to claim 4, wherein said first and second fibers are mixed substantially in the ratio of 1:1 by weight.

6. The cushion according to claim 3, wherein said first and second fibers have denier values of about 38 and 14, respectively.

7. The cushion according to claim 6, wherein said first and second fibers are mixed substantially in the ratio of 1:1 by weight.

8. A seat cushion for use in a seat of an automobile, said cushion comprising an upper layer, a middle layer thicker than the upper layer, and a lower layer thinner than the middle layer, said upper layer consisting of upper synthetic cotton including curled polyester fibers with the denier value of less than 20 which are three-dimensionally intertwined with air-passing space among them, and a polyurethane binder binding the intersections of the polyester fibers, such that said air-passing space is maintained, said middle layer consisting of middle synthetic cotton including first curled polyester fibers with the denier value of 20 or more and second curled polyester fibers with the denier value of less than 20, said first and second polyester fibers being mixed and three-dimensionally intertwined with air-passing space among them, and a polyurethane binder binding the intersections of the polyester fibers, such that said air-passing space is maintained, and said lower layer consisting of lower synthetic cotton including needle-punched curled polyester fibers with the denier value of 20 or more which are three-dimensionally intertwined with air-passing spaces among them, and a polyurethane binder for binding intersections of the fibers, such that said air-passing space is maintained.

9. The seat cushion according to claim 8, wherein the fibers of said upper layer have the denier value of about 6, the first and second fibers of said middle layer have the denier values of about 38 and 6, respectively, and the fibers of said lower layer have the denier value of about 38.

10. The seat cushion according to claim 9, wherein the binder content ranges from 25% to 35%.

11. The seat cushion according to claim 8, wherein the fibers of said upper layer have the denier value of about 6, the first and second fibers of said middle layer have the denier values of about 38 and 14, respectively, and the fibers of said lower layer have the denier value of about 38.

12. The seat cushion according to claim 11, wherein the binder content ranges from 25% to 35%.

13. A seat cushion for use in a seat of an automobile, said cushion comprising an upper layer, a middle layer thicker than the upper layer, and a lower layer thinner than the middle layer, said upper layer consisting of upper synthetic cotton including curled polyester fibers with the denier value of about 20 which are three-dimensionally intertwined with air-passing space among them, and a polyurethane binder binding the intersections of the fibers, such that said air-passing space is maintained, said middle layer consisting of middle synthetic cotton including first curled polyester fibers with the denier value of about 38 and second curled polyester fibers with the denier value of about 6 , said first and second polyester fibers being mixed and three-dimensionally intertwined with air-passing space among them, and a polyurethane binder binding the intersections of the polyester fibers, such that said air-passing space is maintained, and said lower layer consisting of needle-punched lower synthetic cotton including first curled polyester fibers with the denier value of about 38 and second curled polyester fibers with the denier value of about 14, said first and second polyester fibers being mixed and three-dimensionally intertwined with air-passing spaces among them, and a polyurethane binder binding the intersections of the polyester fibers, such that said air-passing space is maintained.

14. The seat cushion according to claim 13, wherein the binder content ranges from 25% to 35%.

15. A seat cushion for use in a seat of an automobile, said cushion comprising an upper layer, a middle layer thicker than the upper layer, and a lower layer thinner than the middle layer, said upper layer consisting of upper synthetic cotton including curled polyester fibers with the denier value of about 6 which are three-dimensionally intertwined with air-passing space among them, and a polyurethane binder binding the intersections of the fibers, such that said air-passing space is maintained, said middle layer consisting of middle synthetic cotton including curled polyester fibers with the denier value of about 20 which are three-dimensionally intertwined with air-passing space among them, and a polyurethane binder binding the intersections of the fibers, such that said air-passing space is maintained, and said lower layer consisting of needle-punched lower synthetic cotton including first curled polyester fibers with the denier value of about 38 and second curled polyester fibers with the denier value of about 14, said first and second polyester fibers being mixed and three-dimensionally intertwined with air-passing spaces among them, and a polyurethane binder binding the intersections of the polyester fibers, such that said air-passing space is maintained.

16. The seat cushion according to claim 15, wherein the binder content ranges from 25% to 35%.

* * * * *

UNITED STATES PATENT AND TRADEMARK OFFICE
CERTIFICATE OF CORRECTION

PATENT NO. : 4,944,992

DATED : July 31, 1990

INVENTOR(S) : YONESHIGE et al

It is certified that error appears in the above-identified patent and that said Letters Patent is hereby corrected as shown below:

TITLE PAGE -

Section [56] "References Cited", right column, insert the following under "U.S. PATENT DOCUMENTS":

| | | | |
|---|---|---|---|
| --4,172,174 | 10/1979 | Takagi............. | 428/288-- |
| --4,477,515 | 10/1984 | Y. Masuda et al.... | 428/288-- |
| --4,563,387 | 1/1986 | S. Takagi et al.... | 428/300-- |

Signed and Sealed this

Twentieth Day of April, 1993

*Attest:*

MICHAEL K. KIRK

*Attesting Officer*

*Acting Commissioner of Patents and Trademarks*